April 28, 1970 C. A. ANDERSON 3,508,781
CAMPER BODY STRUCTURE
Filed Aug. 23, 1968 2 Sheets-Sheet 1
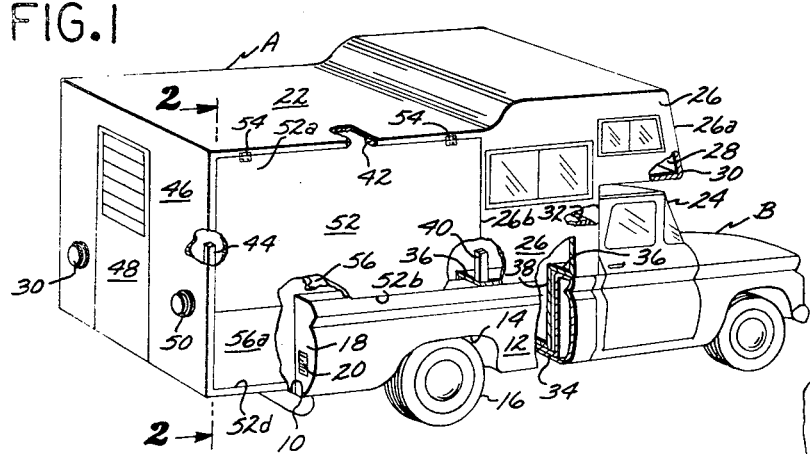
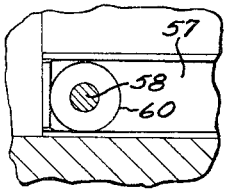
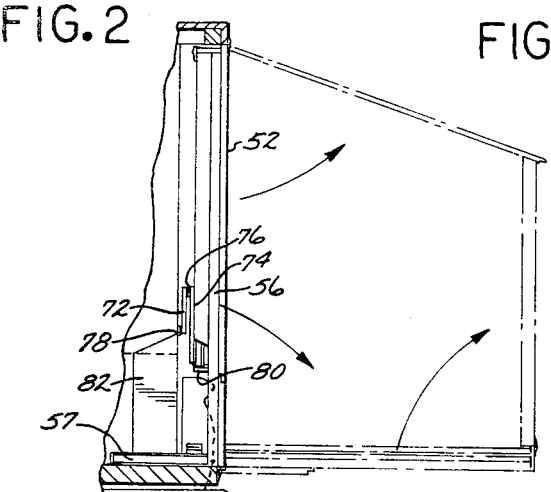
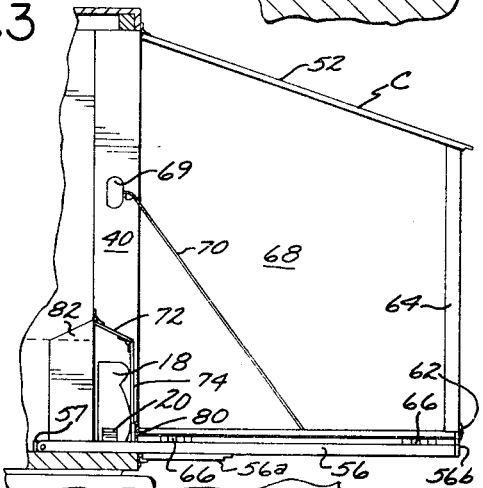
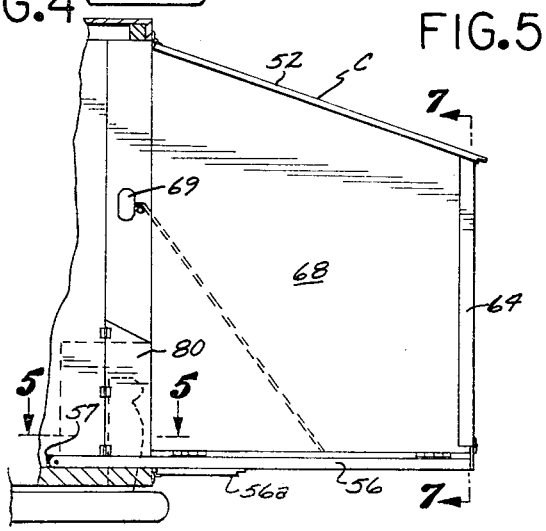
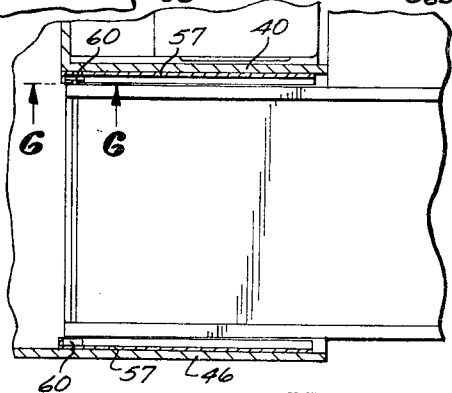
INVENTOR.
CHARLES A. ANDERSON
BY
William G. Babcock
ATTORNEY

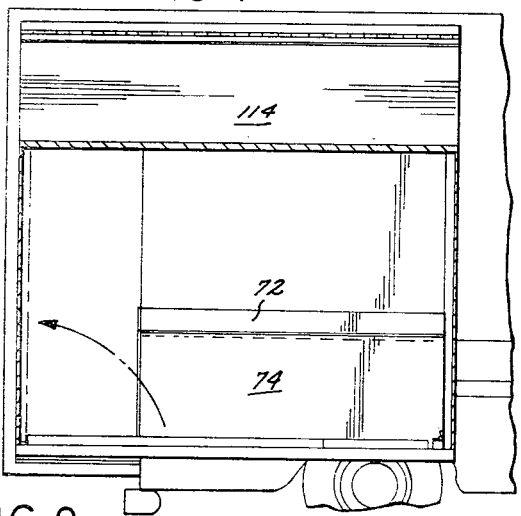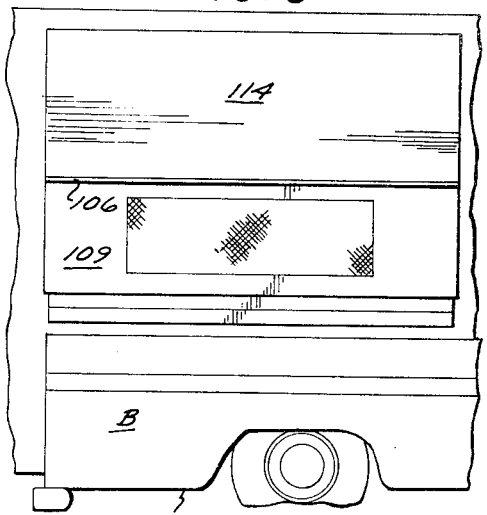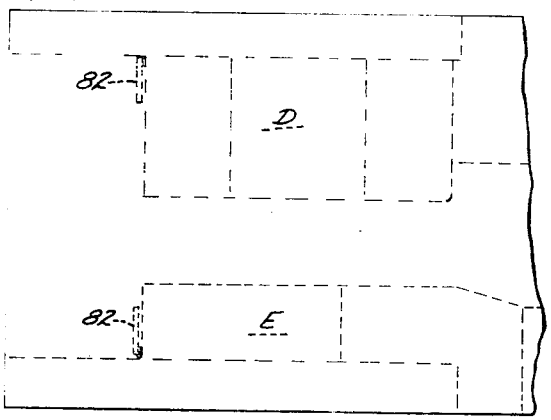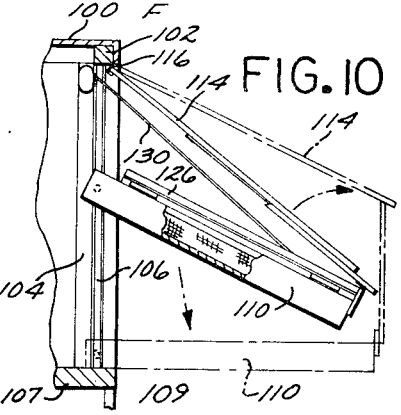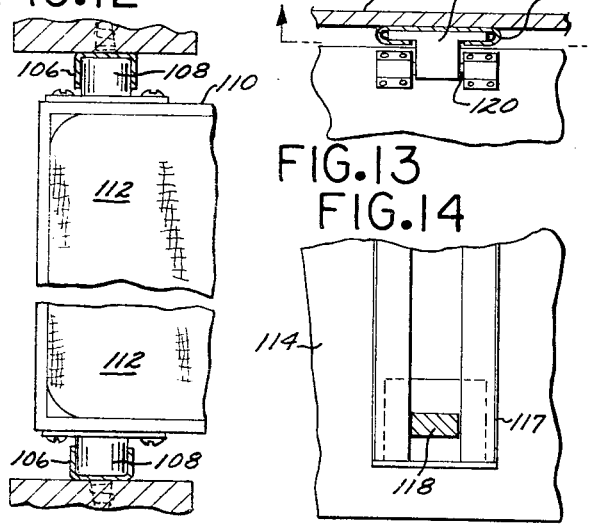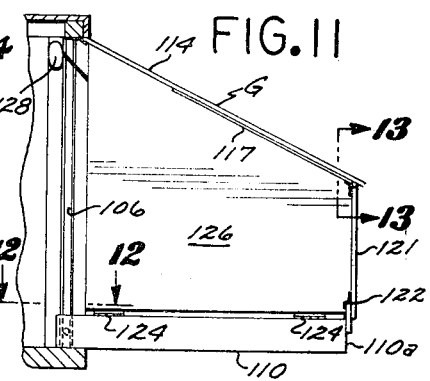
INVENTOR.
CHARLES A. ANDERSON
BY
William G. Babcock
ATTORNEY ID = 3,508,781
Patented Apr. 28, 1970

3,508,781
CAMPER BODY STRUCTURE
Charles A. Anderson, 10440 Ferina St.,
Bellflower, Calif. 90706
Filed Aug. 23, 1968, Ser. No. 754,898
Int. Cl. B60p *3/32*
U.S. Cl. 296—23                                5 Claims

ABSTRACT OF THE DISCLOSURE

A camper body having side portions which are adapted to increase the sleeping capacity of the camper body when the vehicle on which it is mounted in a parked position.

BACKGROUND OF THE INVENTION

Field of the invention

A camper body capable of being removably mounted on a flat bed of a pick-up truck, and when so mounted, at least one side portion of the body is adapted to be laterally expanded to provide an enclosed extension and thereby increase the sleeping quarters within the camper body.

Description of the prior art

The popularity of camper bodies that may be removably mounted on pick-up trucks has increased tremendously in the past few years. Camper bodies of this type provide an inexpensive shelter for use when on vacation, or hunting and fishing trips, yet can serve as a lockable storage space in which luggage, guns, fishing rods, or like equipment may be contained during transportation thereof. Inasmuch as the bed of a pick-up truck is relatively narrow, camper bodies of the character described have suffered in the past from the disadvantage that they provide but limited floor area for sleeping quarters.

SUMMARY OF THE INVENTION

A major object of the present invention is to provide a camper body of substantially the same width as the bed of the pick-up truck on which it is mounted, but after the camper body and truck combination reaches the desired destination or camping location it is possible to laterally expand one or more side portions of the body to provide additional enclosed floor area that may be used for sleeping quarters.

Another object of the invention is to furnish a camper body of relatively simple mechanical structure which can be fabricated from standard, commercial available materials, is simple and easy to use, and will provide operational advantages not attainable by equipment of this type available on the present day market.

BRIEF DESCRIPTION OF THE DRAWING

FIGURE 1 is a perspective view of a first form of a camper body mounted on a pick-up truck, which body is capable of being laterally expanded to provide additional enclosed floor area that may be used for sleeping quarters;

FIGURE 2 is a fragmentary vertical cross-sectional view of the camper body, taken on line 2—2 of FIGURE 1, showing an expanded side portion thereof in phantom line;

FIGURE 3 is a second vertical, cross-sectional view of the camper body shown in FIGURE 2, but with the components of the body having been moved to laterally expanded positions where they define the enclosed extension;

FIGURE 4 is a vertical, cross-sectional view of the camper body shown in FIGURE 2, but with the end walls associated with the expanded floor area having been placed in upright positions to complete the enclosed extension;

FIGURE 5 is a fragmentary, horizontal, cross-sectional view of a portion of the camper body taken on line 5—5 of FIGURE 4;

FIGURE 6 is a second fragmentary, vertical, cross-sectional view of a portion of the camper body, taken on line 6—6 of FIGURE 5;

FIGURE 7 is a vertical, cross-sectional view of the expanded portion of the camper body, taken on line 7—7 of FIGURE 4;

FIGURE 8 is a top plan view of the camper body prior to lateral expansion thereof as shown in FIGURES 2–3 inclusive;

FIGURE 9 is a side elevational view of a second form of camper body that may be laterally expanded to provide additional area which may be used for sleeping quarters;

FIGURE 10 is a fragmentary, transverse, cross-sectional view of the expansible portion of the second form of camper body;

FIGURE 11 is the same view as that of FIGURE 10, but after the laterally expansible portion of the body has been arranged to provide an enclosed floor area;

FIGURE 12 is a fragmentary, horizontal cross-sectional view of a portion of the second form of camper body, taken on line 12—12 of FIGURE 11;

FIGURE 13 is a fragmentary, vertical cross-sectional view of a portion of the second form of camper body, taken on line 13—13 of FIGURE 11; and FIGURE 14 is a fragmentary, vertical cross-sectional view of a portion of the second form of camper body, taken on line 14—14 of FIGURE 13.

DESCRIPTION OF THE PREFERRED EMBODIMENT

A first form A of the camper body is shown in FIGURE 1 which is removably supported on the flat bed 10 conventional pick-up truck B. Two longitudinally extending side walls 12 project upwardly from the bed 10 that are of hollow construction. In each side wall 12 an upwardly extending transverse recess 14 is formed that is in transverse alignment with one of the rear wheels 16 of the vehicle B. The rear end of each side wall 12 (FIGURE 1) is closed by a transverse plate 18 that serves as a mounting for a recessed tail light 20.

Camper body A includes an elongate top 22 which extends over the cab 24 of the pick-up truck B rearwardly from the bed 10. Two laterally spaced inverted, L-shaped side walls 26 extend downwardly from top 22. The forward vertically extending edges 26a of side walls 26 are connected by a transverse wall 28 that merges with a horizontal member 30. A mattress or flat cushion (not shown) may be disposed on member 30 that may be used for sleeping purposes. The rear ends of the member 30 develop into a vertical wall 32, as also shown in FIGURE 1, which is located directly behind the cab 24 of truck B. The lower edge of wall 32 is connected to a horizontal floor 34 that forms a part of the first form A of the camper body.

The rear portions of the two side walls 26 extend downwardly to horizontal, inwardly extending members 36, the inner ends of which are connected to vertical walls 38 affixed to longitudinal side edges of the floor 34. Each of the walls 26 has a rear vertical edge 26b, as shown in FIGURE 1, that is in transverse alignment with the rear face of a first upright 40 extending from the member 36 to the top 22. The upper end of each member 40 supports a horizontal, rearwardly extending roof-supporting member 42, as may best be seen in FIGURE 1. The rear end of each member 42 is in turn supported by the upper end of a second upright 44 secured to the floor 34.

The uprights 44 (FIGURE 1) are situated a substantial distance to the rear of the plates 18. Uprights 44 are joined by a transverse end wall 46, and this wall is also connected to the rear edges of the top 22 and floor 34. A door 48 is provided in end wall 46 for access into the first form A of the camper body.

Two electrically operated tail lights 50 are supported by the end wall 46 on opposite sides of the door 48, as illustrated in FIGURE 1. Tail lights 50 are necessary when the first form A of the camper body is supported on the pick-up truck B, for when so supported, the body conceals the tail lights 20. At least one longitudinal side structure of the first form A of the camper body includes a rectangular panel 52 (FIGURE 1). Panel 52 is supported by hinges 54 from the member 42 in a depending position, and each of these panels can be pivoted outwardly to the position shown in phantom line in FIGURE 3. Each panel 52 has an inverted, L-shaped, vertically extending floor-defining member 56 disposed inwardly therefrom, as may best be seen in FIGURE 2.

Two longitudinally spaced, transversely positioned guides 57 are supported on the floor 34 between that plate 18 and upright 44 located rearwardly thereof. A portion 56a of each floor-defining member 56 situated between one of the uprights 44 and plates 18, and pins 58 extend outwardly from opposite sides of a first end floor portion to rotatably support rollers 60, as shown in FIGURE 6, that are movably supported in the guides 57.

When the panel 52 associated with each member 56 is pivoted outwardly to the position shown in phantom line in FIGURE 2, the floor member may be swung outwardly and downwardly into a horizontal position illustrated in FIGURE 3. After each floor-defining member 56 is placed downwardly into a horizontal position, it may be moved inwardly relative to the side wall 12 closest thereto. When horizontally disposed and in abutting contact with that side wall 12 most adjacent thereto, the floor-defining member 56 is situated below the upper portion of recess 14 provided in that side wall.

The second edge 56b of each floor-defining member 56 supports hinges 62 secured to a wall member 64 that may be pivoted into the upright position shown in FIGURE 3. Each member 56 is provided with hinges 66 on the longitudinal edges thereof, which support end walls 68 that may be pivoted to upright positions after the wall member 64 and panel 52 have been positioned in the manner shown in FIGURE 3. The upper edges of the end walls 68 are angularly disposed and adjacent the under surface of the panel 52 when the panel is positioned as shown in FIGURE 3.

A spring-loaded reel 69 is mounted on upright 40 (FIGURE 3), and a cable 70 is wound thereon with one end thereof secured to the floor-defining member 56. A stop (not shown) is provided on each cable 70, and this stop is operatively associated with the reel 69 in such a manner that the floor-defining member 56 will not pivot below the horizontal position. When each member 56 is moved inwardly until the inner edge thereof is in contact with the side wall 12, the rollers 60 are disposed at the inner ends of guides 57. Rollers 56, when so positioned, prevent the floor defining member 56 from pivoting downwardly below a plane normal to the upright 40.

After the components described herein have been expanded in the manner shown in FIGURE 3, an enclosed camper body extension C is provided that is in communication with the interior of camper body A. A mattress or cushion may be placed on the floor-defining member 56 whereby this additional floor area may be used for sleeping quarters.

Prior to moving the vehicle B, the components shown in FIGURE 3 are collapsed into the position shown in solid line in FIGURE 2 wherein the floor-defining member 56 is situated below the upper extremity of one of the recesses 14, making it possible for cold air to pass upwardly through this recess into the confines of the camper body extension C if preventive means were not provided.

Two elongate, rectangular shields 72 and 74 are provided for each extension C (FIGURES 2 and 3), and these shields are pivotally connected at the adjacent edges thereof by hinges 76. The free edges of the shield 72 are pivotally supported from the first and second uprights 40 and 44 by hinges 78. The free edge of shield 74 is pivotally supported by hinges 80 extending from the floor-defining member 56. When member 56 is pivoted to the downwardly and outwardly extending position shown in FIGURE 3, the shields 72 and 74 are moved to the positions shown in that figure where they extend over the side wall 12 and prevent entrance of air into the interior of extension C through recess 14.

Build-in fixtures D and E are provided in the first form A of the camper body, as shown in FIGURE 8, which serve to pivotally support two doors 82 that may be moved outwardly to close the rear ends of the shields 72 and 74 when they are in the expanded positions.

From the above description, it will be seen that an extension C may be provided on either or both longitudinal sides of the first form A of the camper body. In use, the operation of the first form A of the camper body is relatively simple. The camper body is mounted on the flat bed 10 of a pick-up truck or similar vehicle B in the conventional manner, with the floor portion 56a of each floor-defining member 56 of the camper body being disposed rearwardly of one of the transverse plates 18, as illustrated in FIGURE 1. When the first form A of the camper body is being transported to a desired location on the vehicle B, it is in the position shown in FIGURE 1.

Upon arrival at the destination, panel 52 is pivoted upwardly and outwardly where it occupies the position shown in FIGURE 3, and the floor-defining member 56 is thereafter swung downwardly and outwardly. From this horizontal position member 56 is then moved inwardly relative to the side wall 12 most adjacent thereto, until the inner edge of the floor-defining member is in abutting contact with the side wall in the manner also shown in FIGURE 3.

The wall member 64 is thereafter pivoted upwardly and outwardly into a vertical position (FIGURE 3). End walls 68 are then moved upwardly into substantially vertical positions, which completes the extension C that is in communication with the interior of the first form A of camper body. When the floor-defining member 56 is pivoted downwardly and outwardly to the position shown in FIGURE 3, the shields 72 and 74 are automatically moved into the positions shown in this figure where they extend downwardly over the recess 14 in one of the side walls 12.

By use of the doors 82, the rear ends of the tunnel defined by the shields 72 and 74 is closed, whereby passage of cold air upwardly in the side wall 12 to enter this tunnel into the interior of the first form A of the camper body is prevented. When it is desired to move this form of the camper body, the above-described operation is reversed to place the components shown in FIGURE 3 in the positions illustrated in solid line in FIGURE 2 where the exterior of the panel 52 is substantially flush with the exterior surface of one of the side walls 12.

The second form F of the camper body is shown in FIGURES 9–14 inclusive that is adapted to be removably mounted on the pick-up truck B in the same manner as the first form A. Form F includes a roof 100 supported by two laterally spaced, longitudinally extending horizontal members 12. The members 102 are supported by two longitudinally spaced uprights 104, as may be seen in FIGURE 10. The uprights 104 are held in a fixed position on a horizontal member 107 (FIGURE 10). A side wall portion 109 extends downwardly from member 107, as may be seen in FIGURE 9.

A vertically extending rail 106 of U-shaped transverse cross section is secured to each of the uprights 104, and these rails are slidably engaged by pins 108 secured to the inwardly disposed ends of a rectangular frame 110 which supports a mattress 112, as illustrated in FIGURES 10 and 12. The upper edge of a rectangular panel 114 (FIGURE 10) is pivotally supported by hinges 116 secured to member 102.

One or more guides 117 are attached to panel 114, as may be seen in FIGURES 10, 13 and 14, and these guides are slidably engaged by T-shaped members 118. Members 118 are pivotally connected by pins 120 to the upper portion of a rectangular wall member 121, which is pivotally supported by hinges 122 on the end 110a of frame 110 (FIGURE 11). Hinges 124 are also secured to the opposite sides of the frame 110 which pivotally support two end walls 126. End walls 126 may be pivoted upwardly to the vertical position shown in FIGURE 11 to provide the enclosed extension G shown in the same figure that is used for sleeping quarters.

Spring-loaded reels 128 are affixed to the uprights 104, and cables 130 extend downwardly therefrom to the frame 110. When the component parts of form F of the invention are in a collapsed position (FIGURE 9), a panel 114 is substantially flush with the side wall portion 109. The second form F of the camper body may be moved from place to place on a pick-up truck B when the panel 114 is so disposed.

After the intended destination is reached, the panel 114 is pivoted outwardly to the position shown in phantom line in FIGURE 10, and during this movement thereof, the T-shaped members 118 slide within guides 116 until the wall member 121 is positioned as shown in FIGURE 11. As this movement of panel 114 and member 121 takes place, the frame 110 pivots downwardly until it occupies the position shown in phantom line in FIGURE 10 wherein it is substantially horizontal and may be used for sleeping quarters. The end walls 126 are then moved upwardly to place them in the positions shown in FIGURE 11.

The extension G is enclosed and in communication with the interior of the second form F of the camper body. When it is desired to move this second form F of the invention on the pick-up truck B, the operation described herein is reversed to return the panel 114 to the position shown in FIGURE 9. From the above description, it will also be seen that an extension G may be provided on either one or both sides of the form F of the invention.

Although the invention has been illustrated and described as being applied to a camper body, it will be apparent that the invention is also applicable for use with trailer and motor homes. The word "camper" as used in the specification and claims is to be construed to also include trailer and motor homes.

I claim:
1. In a camper body of the type including a roof, forward and rear end walls, side walls and a floor, which camper body is adapted to be supported on a flat bed of a pick-up truck, with a first portion of said floor projecting rearwardly from said bed from the longitudinal edges of which hollow parallel walls project upwardly that partially surround the rear wheels of said truck, and in which walls upwardly extending recesses therein are in transverse alignment with said rear wheels, the improvement for increasing the floor area of said camper body when said truck is in a stationary position wherein at least one of said side walls are defined by a structure, comprising:
  (a) first and second longitudinally aligned uprights fixedly disposed in positions relative to a side edge of said floor, with said first upright being positioned forwardly of the rear end of said bed and said second upright located rearwardly therefrom;
  (b) a horizontal member extending between upper portion of said uprights;
  (c) a rectangular panel pivotally supported from said horizontal member;
  (d) a pair of guides mounted on the upper surface of said first portion of said floor;
  (e) first means for slidably and pivotally engaging said guides;
  (f) an inverted L-shaped floor-defining member connected on a first end thereof to said first means which floor-defining member and panel when vertically positioned closing at least a portion of one side of said camper body;
  (g) a wall section pivotally connected to a second end of said floor-defining member opposite said first end thereof;
  (h) two end wall sections pivotally supported from opposite sides of said floor-defining member;
  (i) second means for holding said floor-defining member in a horizontal position after said panel has been pivoted upwardly and outwardly, and said floor-defining member downwardly and outwardly and then inwardly, to place an edge of said floor-defining member in abutting contact with an outer surface of that one of said side walls most adjacent thereto below the upper extremity of said recess; and
  (j) third means for preventing air from passing through said recess into the interior of said camper body and the interior of an enclosed extension provided by said floor-defining member when in a horizontal position with said wall section and end wall sections extending upwardly therefrom, with said panel resting on the upper edges of said wass section and end wall sections to serve as a roof for said extension.

2. A camper body as defined in claim 1 wherein said first means comprise rollers rotatably supported from said floor member.

3. A camper body as defined in claim 1 wherein said second means comprises:
  (k) a spring-loaded reel mounted on one of said uprights;
  (l) a cable mounted on said reel and extending to said floor-defining member; and
  (m) a stop for preventing cable from unwinding from said reel after said floor-defining member is in a substantially horizontal position.

4. A camper body as defined in claim 1 wherein said third means comprise:
  (k) a plurality of elongate shields pivotally connected at the adjacent longitudinally extending edges thereof;
  (l) first hinge means in said body for pivotally supporting a free longitudinal edge of a first one of said shields; and (m) second hinge means for pivotally connecting a free longitudinal edge of a second one of said shields to said floor-defining member, with said third means when said floor-defining member is in a horizontal position extending over said recess in said side wall of said truck.

5. A camper body as defined in claim 4 which further includes:
(n) a door operatively associated with said shields for preventing flow of air from the ambient atmosphere into the interior of said camper body when said shields are so disposed as to extend over said recess.

References Cited

UNITED STATES PATENTS

| | | | |
|---|---|---|---|
| 2,788,238 | 4/1957 | Baird | 296—23 |
| 3,399,922 | 9/1968 | Burton | 296—23 |
| 3,290,085 | 12/1966 | Damiani | 296—23 |
| 2,676,839 | 4/1954 | Lacoste | 296—23 |

PHILIP GOODMAN, Primary Examiner

U.S. Cl. X.R.

52—66